United States Patent

Basavanhally

Patent Number: 5,281,301
Date of Patent: Jan. 25, 1994

[54] ALIGNMENT AND ASSEMBLY METHOD

[75] Inventor: Nagesh R. Basavanhally, Trenton, N.J.

[73] Assignee: AT&T Laboratories, Murray Hill, N.J.

[21] Appl. No.: 878,245

[22] Filed: May 4, 1992

Related U.S. Application Data

[63] Continuation-in-part of Ser. No. 705,229, May 24, 1991, Pat. No. 5,135,590.

[51] Int. Cl.⁵ .................................................. B44C 1/22
[52] U.S. Cl. ................................... 156/629; 156/293; 156/182; 359/620; 359/621; 385/33; 385/52; 385/63; 430/321
[58] Field of Search .................. 359/619–621, 359/819, 821; 385/52, 33, 35, 59, 63; 156/293, 629, 644, 292, 294, 299, 182; 430/321

[56] References Cited

U.S. PATENT DOCUMENTS

| | | | |
|---|---|---|---|
| 4,074,933 | 2/1978 | Yevick | 359/619 |
| 4,689,291 | 8/1987 | Popovic et al. | 430/321 |
| 4,735,671 | 4/1988 | Stoffel et al. | 156/299 |
| 4,755,017 | 7/1988 | Kapany | 385/52 |
| 4,835,078 | 5/1989 | Harvey et al. | 430/22 |
| 4,875,750 | 10/1989 | Spaeth et al. | 385/35 |
| 5,073,003 | 12/1991 | Clark | 385/33 |

OTHER PUBLICATIONS

"Light Coupling Characteristics of Planar Microlens," M. Oikawa et al., *SPIE* vol. 1544 Miniature and Micro-Optics: Fabrication and System Applications, 1991, pp. 226–237.

"Technique for Monolithic Fabrication of Microlens Arrays", Z. D. Popovic, *Applied Optics*, vol. 27, No. 7, Apr. 1, 1988, pp. 1281–1284.

"Stacked Planar Optics: An Application of the Planar Microlens," K. Iga et al., *Applied Optics*, vol. 21, No. 19, Oct. 1, 1982, pp. 3456–3460.

*Primary Examiner*—David A. Simmons
*Assistant Examiner*—Chester T. Barry
*Attorney, Agent, or Firm*—Roderick B. Anderson

[57] ABSTRACT

A first array of microlenses (16) on a lens substrate (15) is accurately aligned with a lens holder (20) by making a second array of microlenses (17) simultaneously with the first array. The second array of microlenses is arranged around the periphery of the lens substrate and is made solely for alignment purposes, rather than for focusing light. An array of detents (21, FIG. 2) is made in one surface of the lens holder such that, when the lens holder is abutted against the lens substrate, each microlens (17) of the second array can extend into one of the detents of the lens holder member, thereby to align the first array of microlenses with the lens holder member. The lens holder member has an opening (22) to permit light to be transmitted to or from the first array of microlenses (16). A pair of alignment pins (24) aligns the lens holder member with an array of optical fibers (12).

22 Claims, 3 Drawing Sheets

ALIGNMENT AND ASSEMBLY METHOD

This is a continuation-In-part of the patent application of N. R. Basavanhally et al., Ser. No. 705,229, filed May 24,1991, hereby incorporated herein by reference now U.S. Pat. No. 5,135,590.

TECHNICAL FIELD

This invention relates to methods for aligning and assembling optical devices and, more particularly, to methods for making microlens assemblies.

BACKGROUND OF THE INVENTION

The parent patent application describes the use of a free-space photonics switch which takes light projected from the ends of a bundle of optical fibers, operates on the light to perform desired switching functions, and then projects the light into the end of a second array of optical fibers. The optical fiber ends of each bundle form a matrix configuration which must be accurately registered with the other apparatus. Each fiber comprises a core of relatively high index glass having a small diameter, typically five microns, surrounded by low refractive index cladding glass. By holding the ends of the fibers in a securing member having apertures made by photolithogaphic masking and etching, the application describes how the fiber ends can be held in a desired matrix array to within micron tolerances.

Free-space photonic switches also require a matrix aitay of microlenses which must be accurately aligned with the optical fiber ends so that each microlens can focus light onto each fiber end or project light from a fiber end. The paper, "Technique for Monolithic Fabrication of Microlens Arrays," Z. D. Popovic et al., Applied Optics, Vol. 27, No. 7, Apr. 1, 1988, pp. 1281-1284, describes one method of making an appropriate matrix array of microlenses that can be used in conjunction with an optical fiber bundle. The method involves the use of photolithographic masking and etching to form a matrix pattern of polymer elements on a glass substrate. The polymer elements are then heated sufficiently to soften or melt them, giving rise to a roughly spherical meniscus for each element which defines its geometry. The array is then cooled so that the polymer elements are each hardened in a spherical configuration which, in conjunction with the glass substrate, can act as a microlens for focusing light on the core of a single optical fiber. Each microlens is typically twenty-five to two hundred microns in diameter. After the microlens array has been made, properly mounting it in registration with the ends of the optical fiber bundle can be difficult and painstaking.

Because of their importance both to communications and to high-speed computing, there has been a long-felt need in the industry for techniques that can be used to assemble and arrange an array of microlenses with respect to other optical apparatus, that are relatively inexpensive, that do not require a great deal of operator skill, and that are dependably accurate to within micron dimensions.

SUMMARY OF THE INVENTION

I have found that a first array of microlenses on a lens substrate can be accurately aligned with a lens holder by making a second array of microlenses simultaneously with the first array. The second array of microlenses is arranged around the periphery of the lens substrate and is made solely for alignment purposes, rather than for focusing light. An array of detents is made in one surface of the lens holder such that, when the lens holder is abutted against the lens substrate, each microlens of the second array can extend into one of the detents of the lens holder member, thereby to align the first array of microlenses with the lens holder member.

The lens holder member can thereafter be aligned with a matrix array of optical fiber ends by abutting it against alignment pins that in turn abut against the securing member that holds the optical fiber ends. The securing member may be made of monocrystalline silicon so that a groove can be precisely made in it by photolithogaphic masking and etching, the groove bearing against the alignment pin. Likewise, the lens holder can be made of monocrystalline silicon so that a matching alignment groove can be made in it which bears against the alignment pin to give alignment with the optical fiber securing member. Making the lens holder of silicon also permits the detent array to be made by photolithographic masking and etching, again with great precision.

As will be appreciated from the following description, a microlens can be assembled with great accuracy so as to image light onto a matrix array of optical fiber ends in a manner that is relatively inexpensive, does not require a great deal of operator skill, and that can be dependably accurate to within micron or sub-micron dimensions. These and other objects, features, and benefits of the invention win be better understood from a consideration of the following description taken in conjunction with the accompanying drawing.

DETAILED DESCRIPTION

Figure 1:
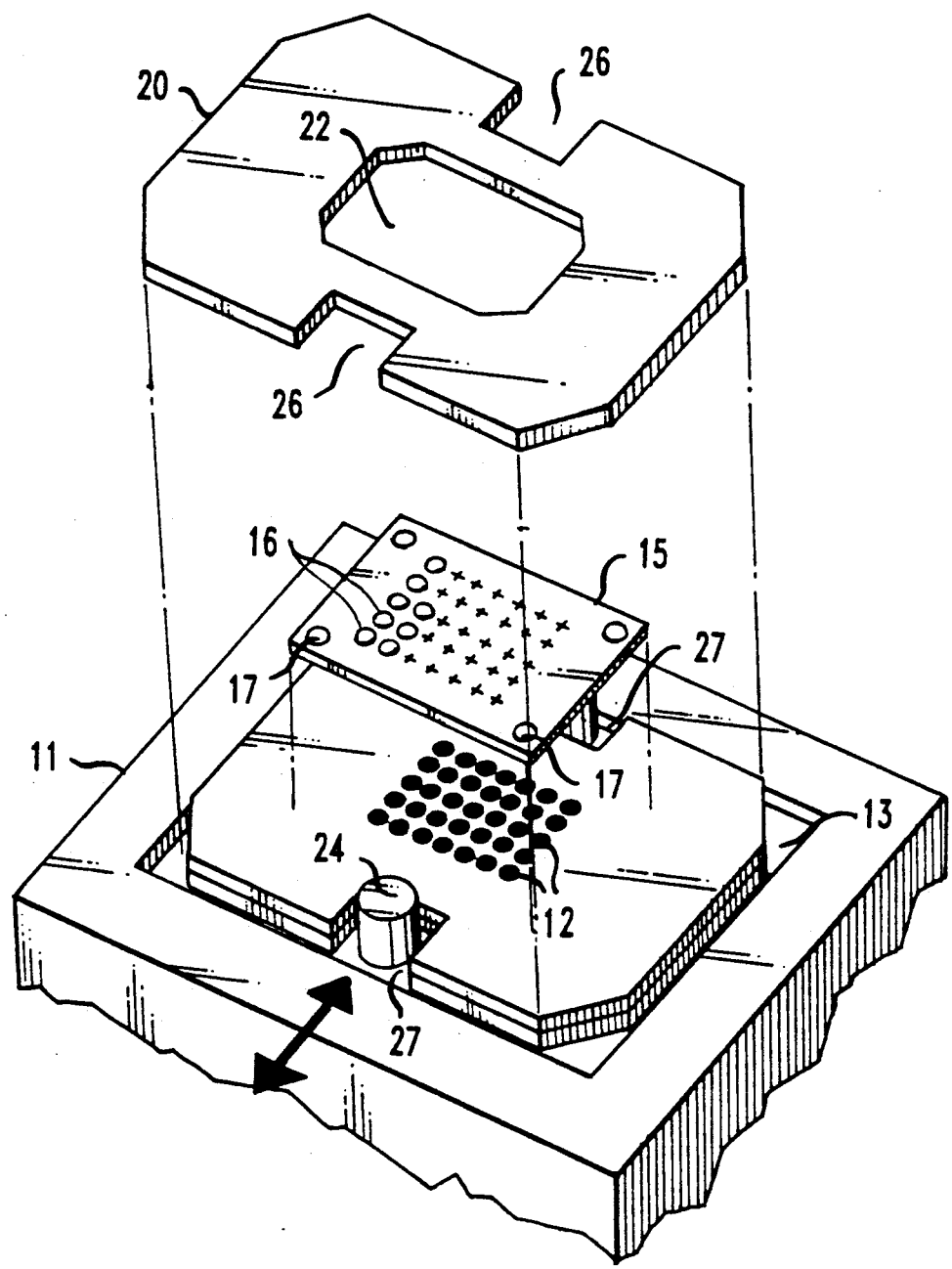
FIG. 1 is a schematic partially exploded view of a microlens array to be assembled in alignment with an optical fiber array.
Figure 2:
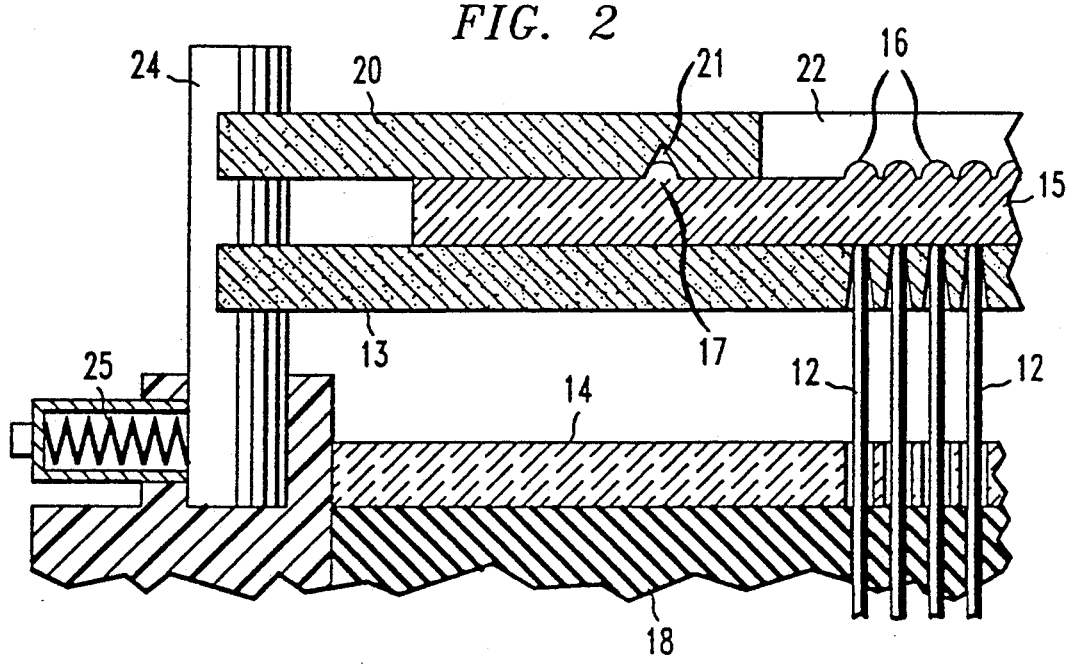
FIG. 2 is a schematic sectional view of part of the microlens array of FIG. 1 assembled in alignment with part of an optical fiber array in accordance with an illustrative embodiment of the invention.

The drawings are not necessarily to scale and certain parts of them have been simplified to aid in clarity of exposition. Referring to FIGS. 1 and 2, there is shown schematically an optical device 1 1 comprising a bundle of optical fibers 12, the ends of which are arranged in a matrix array configuration held in place by a securing member 13. As described in the parent application, optical fibers 12 are inserted into apertures of the securing member 13 by first projecting them through apertures in a guiding member 14. The securing member 13 may be of monocrystalline silicon in which funnel-shaped apertures can be etched, which further aids in accurate placement of ends of the fibers 12. After insertion, the optical fibers 12 are permanently held in place by an epoxy 18.

Displaced from the optical fiber ends 12 is a lens substrate 15 having defined on an upper surface a first array of microlenses 16 and a second array of microlenses 17. The microlens array 16 has the same configuration as the matrix array of the ends of the optical fibers 12, while the microlens array 17 comprises four microlenses included around the periphery of the lens substrate 15. Displaced from the lens substrate 15 is a lens holder member 20, the purpose of which is to hold the microlens array 16 in precise alignment with the optical fiber ends 12.

Located on the underside of lens holder 20, and therefore not shown in FIG. 1, are four alignment detents or apertures, each aligned with one of the second array of microlenses 17. One of these alignment detents 21 is shown in FIG. 2, and one can see that it fits snugly over one of the microlenses 17. The other three microlenses 17 likewise extend into one of the alignment detents on the underside of lens holder 20. The lens holder 20 contains an opening 22 which exposes the first array of microlenses 16. The lens holder 20 is aligned with the securing member 13 by alignment pins 24 that bear against the securing means as shown by the arrow of FIG. 1. The force may be provided by a spring 25 of FIG. 2. As shown in FIG. 1, the lens holder member has pyramidal shaped alignment grooves 26 on opposite sides which correspond to similar pyramidal shaped grooves 27 on opposite sides of the securing member 13. Thus, when the alignment pin 24 bears against grooves 27 and 26, and a similar alignment pin bears against the grooves on the opposite side from that shown in FIG. 1, then the lens holder 20 is in predetermined alignment with the securing member 13. Since the optical fibers 12 are in precise alignment with securing member 13, this assures that the microlenses 16 are each registered and in alignment with one of the optical fibers 12 as shown in FIG. 2.

Figure 3:
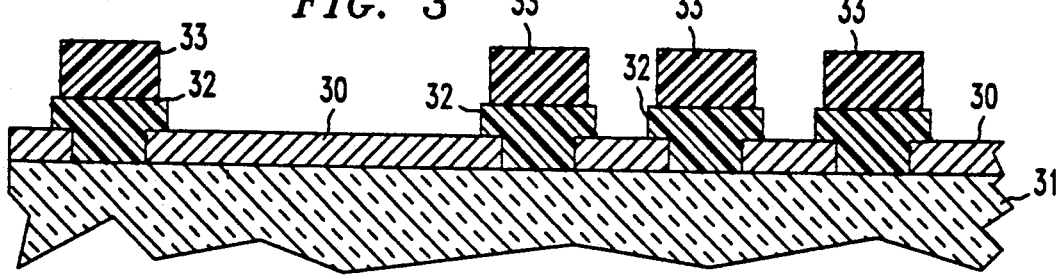
FIGS. 3 and 4 are schematic sectional views showing successive steps in the fabrication of the microlens array of FIGS. 1 and 2.
Figure 4:
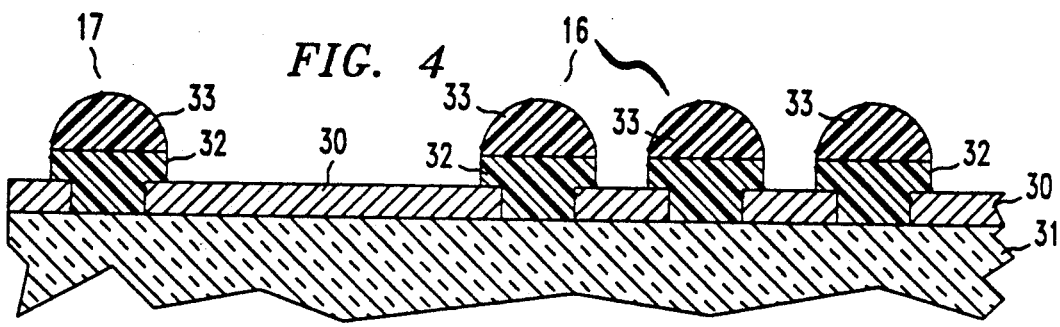

FIGS. 3 and 4 illustrate one method of making the microlens array of FIGS. 1 and 2, that is, the method described in the aforementioned Popovic et al. publication. In accordance with that method, an array of apertures is first defined by masking and etching in a metal layer 30 overlying a glass substrate 31. Next, a layer of polymer is formed over the metal layer 30, and photolithographic masking and etching is used to define precisely an array of polymer platform elements 32 each covering one of the metal layer apertures. Next, a thick layer of polymer is formed over the structure which is also etched by photolithographic masking and etching to define a series of polymer elements 33, one overlying each of the platform elements 32.

Referring to FIG. 4, the assembly of FIG. 3 is then heated to a temperature sufficient to melt or soften the polymer elements 33 to cause them to have a geometry defined by a spherical section. That is, their outer surface is defined by a meniscus which will wet the platforms 32 such that the outer peripheries of elements 33 correspond to the outer peripheries of platforms 32. After the polymer elements 33 are cooled and hardened, they constitute microlenses; that is, each element 33 and 32 acts with the underlying glass substrate 31 to constitute a single lens element.

In accordance with the invention, the microlenses 17 on the outer periphery of the substrate are made simultaneously with the microlens array 16 in the central portion of the glass substrate. In accordance with the present state-of-the-art, the masking and etching of polymer elements as described is sufficiently advanced that the geometries of microlenses 17 can be made to accuracies within a micron or less than a micron. Microlens 17, of course, does not function as a lens, but is simply a mechanical projection used for alignment purposes. One can appreciate, however, that it is convenient to fabricate this projection in a manner that does not appreciably add to the cost of making the microlens structure and in a manner that does not require any additional operator skill.

Referring again to FIG. 2, these factors are consistent with the fact that detents 21 can be made in a silicon holder member 20 through photolithographic masking and etching, again with a precision to within a micron or less than a micron. It is not essential that holder member 20 be made of silicon or other monocrystalline material, but for purposes of illustration, one can appreciate the accuracy with which the detents 21 can be made in such a monocrystalline material. Since the geometry of detents 21 and that of microlens 17 can be made with such extreme accuracy, the fit of the microlens into the detents can be made such that there is virtually no "play" between the fitted elements, thus ensuring precise alignment of the lens substrate with the holder element 20. For illustrative purposes, the surface in which detents 21 are made may be the <100> crystallographic surface, in which case the silicon inherently etches along crystallographic planes at an angle of 57.4° with respect to the horizontal.

As mentioned before, the grooves 26 and 27 in the lens holder member and the securing member may likewise be made by photolithographic masking and etching with extremely fine tolerances, particularly if both members are made of monocrystalline silicon. That is, groove 26 is made in a precise predetermined location with respect to the location of groove 27. After the lens substrate has been aligned on the lens holder, it is preferred that it be tacked in place with epoxy prior to alignment using the alignment pins 24.

Figure 5:
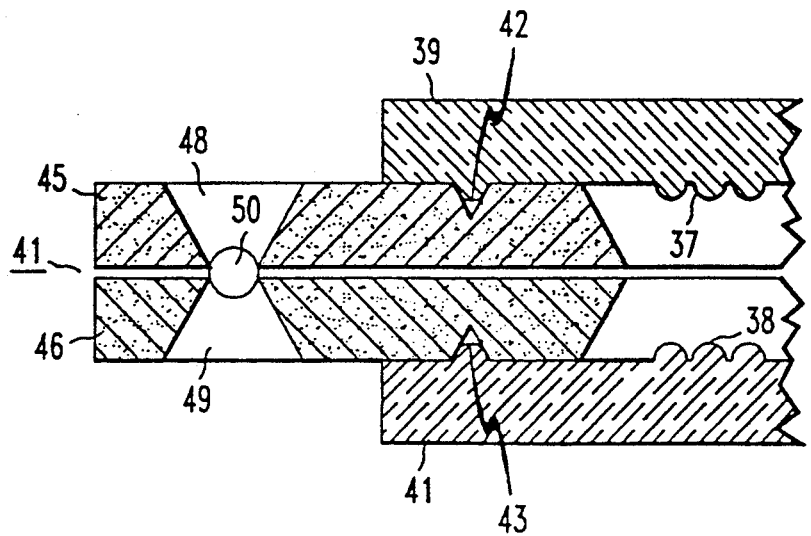
FIG. 5 is a schematic sectional view of an assembly for holding two microlens arrays in alignment.

Referring to FIG. 5, it is sometimes desired that two microlens arrays 37 and 38, respectively formed on lens substrates 39 and 40, be used in conjunction with each fiber array. The two lens substrates then would need to be accurately aligned on opposite sides of a lens holder member 41. That is, an alignment microlens 42 on lens substrate 39 would have to be aligned within an alignment detent on one side of holder 41, with an alignment microlens 43 of lens substrate 40 being aligned within an alignment detent on the opposite side of the lens holder member. If the lens holder member has the configuration shown in FIG. 1, then the alignment detents would have to be formed on opposite sides, which can be difficult to do with the accuracy required. The Harvey et al. U.S. Pat. No. 4,835,078, granted May 30, 1989, is an example of a method that could be used for making alignment detents on opposite sides of a lens holder member with the requisite accuracy.

As an alterative to making the lens holder member of a single body, the lens holder member 41 depicted in FIG. 5 comprises two lens holder elements 45 and 46. On an upper surface of lens holder element 45 are made the microlens alignment detents and an aperture 48, while on the corresponding surface of element 49 are made the microlens alignment detents and an aperture 49. The apertures 48 and 49 have the sloping walls characteristic of etching from corresponding crystal surfaces, but each of the holes is made such that it defines a narrow opening having a smaller diameter than that of a ball lens 50 that is used as a spacer element. The small diameter openings and the outer diameter of the bag lens 50 can again be made with great accuracy, such that a predetermined space between the holder elements 45 and 46 is defined when they are mounted on the ball lenses 50. It is to be understood that there are preferably four ball lenses 50, four alignment microlenses 42 and four alignment microlenses 43, only one of which is shown in FIG. 5 for purposes of simplicity. Lens substrates 39 and 40 are preferably epoxy bonded to elements 45 and 46 which may similarly be bonded together.

The advantage of the embodiment of FIG. 5 is that it is not necessary to mask and etch on opposite sides of a single element to obtain the required microlenses detents on opposite sides of the lens holder member 41. By making the lens holder member 41 of two lens holder elements 45 and 46, masking and etching from one surface is required on each of the two elements, which can again be made with great accuracy without such complications as that, for example, described in the Harvey et al. patent. Whether a given system will require one or two sets of microlenses for each optical fiber array depends upon the use to which such apparatus is to be put; these considerations are known to workers in the art and will not be discussed herein.

Figure 6:
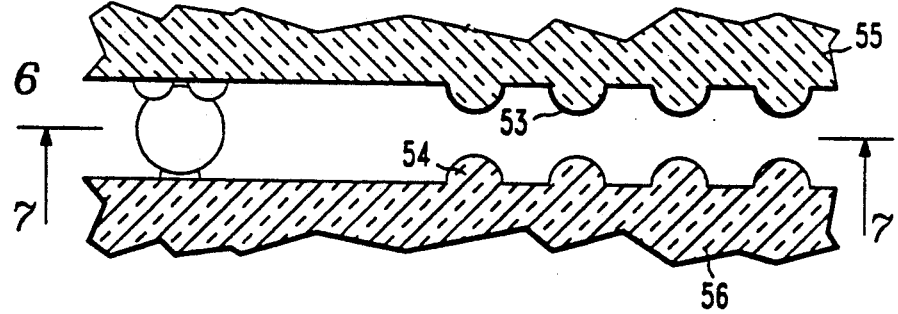
FIG. 6 is a schematic view of an assembly of microlens arrays in accordance with another embodiment of the invention.
Figure 7:
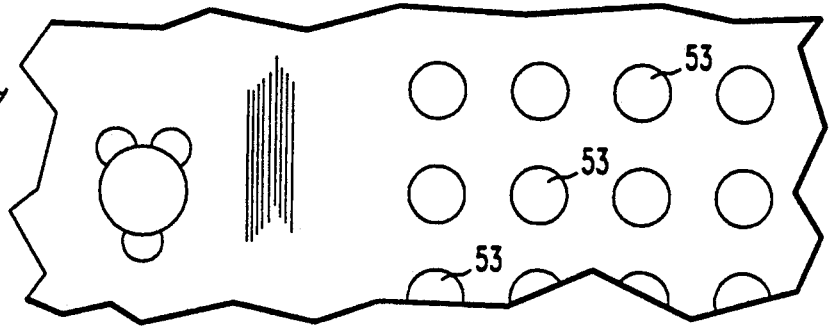
FIG. 7 is a view taken along lines 7—7 of FIG. 6.

FIGS. 6 and 7 illustrate an alternative method for aligning microlens arrays 53 and 54 respectively formed on lens substrates 55 and 56. On the surface of lens substrate 55, a plurality of alignment microlenses 58 are formed and on a surface of lens 56 a plurality of alignment microlenses 59 are formed. As can be seen in FIG. 7, each array of alignment microlenses 58 forms a tripod into which can nest a ball lens spacer 61. The two tripods for holding ball lens spacer 61 can of course be made with ease and accuracy as before. The advantage over the FIG. 5 embodiment is the somewhat simpler structure. After alignment, epoxy bonding can be employed to hold the lens substrates in permanent registration. A plurality of ball lens spacers are used with each pair of lens substrates; preferably four ball lens spacers are located around the periphery of lens arrays 53 and 54.

It is to be understood that the invention may have considerable utility apart from its use with optical fiber arrays; for example, it may be used to align one or more microlens arrays with laser arrays or with photodetector arrays. Optical systems are being developed with great rapidity, and it appears that microlens arrays will be major building blocks of such systems. It is therefore anticipated that the invention may be used in any of a number of structures which may require precise alignment of a microlens array with other elements, and such microlens array may have a configuration other than a matrix.

The advantage of applicant's invention is that there is virtually no incremental cost for making alignment microlenses when one is making a microlens array. Such alignment microlenses can be made with the same precision as the other microlenses are, thereby assuring alignment within a tolerance that is consistent with the size of the microlenses. It does not follow, however, that the alignment microlenses must be of the same diameter as the microlenses of the first array of microlenses. Indeed, in experiments that we have made, the alignment microlenses have been somewhat larger than the microlenses used in the first array. Typical microlens diameters are twenty-five to one hundred fifty microns. For purposes of this application, a microlens shall be considered as one having a diameter of less than about five hundred microns. Typically, we have found it useful to make the alignment microlenses to be of about two hundred fifty microns in diameter which results in a height of about twenty microns, a height that is convenient and appropriate for mechanical alignment within silicon detents. The thickness of the microlens substrates is typically about twenty mils (five hundred microns).

While the use of silicon for the lens holder members has the benefits that have been described, it had been found that brass lens holder members may be used, with the alignment detents being small holes extending through the entire width of such members. Such holes can be made, as is known, with great accuracy using photolithographic masking and etching.

The foregoing are intended to be merely illustrative of the inventive concepts involved. Other embodiments and modifications may be made by those skilled in the art without departing from the spirit and scope of the invention.

I claim:

1. A method for making a device comprising an array of optical fiber ends having a desired configuration, said method comprising the steps of:

forming in a securing member a first array of first apertures, said first array having a configuration corresponding to said desired configuration;

forming on a lens substrate first and second arrays of microlenses, each protruding from a flat surface of the lens substrate, the first array of microlenses having a configuration corresponding to said desired configuration, the second array, of microlenses having a second configuration;

forming on a lens holder member an array of detents having said second configuration;

abutting said lens substrate against the lens holder member such that each microlens of the second array of microlenses extends into one of the detents of the lens holder member, thereby to align the first array of microlenses with the lens holder member;

inserting each optical fiber end into an aperture of the securing member;

permanently fixing the optical fibers to the securing member;

and mounting the holder member in alignment with the securing member, thereby to align each fiber end with one microlens.

2. The method of claim 1 wherein:

the step of mounting the holder member comprises the steps of:

making at least one first groove in the securing member, making at least one second groove in the holder member in a predetermined location with respect to the location of the first groove, and causing both the first and second grooves to bear against an alignment pin.

3. The method of claim 1 wherein:

the lens holder member is made of a monocrystalline material, and the detents are made by photolithographic masking and etching.

4. The method of claim 3 wherein:

the geometries of the first and second arrays of microlenses are defined by photolithographic masking and etching.

5. The method of claim 2 wherein:

the lens holder member and the securing member are both made of a monocrystalline material;

and the first and second grooves are made by photolithogaphic masking and etching.

6. The method of claim 5 wherein:
the detents in the lens holder member are made by photolithographic masking and etching.

7. The method of claim 6 wherein:
the geometries of the first and second arrays of microlenses are defined by photolithographic masking and etching.

8. The method of claim 1 wherein:
the first array of microlenses are all contained on a central portion of the lens substrate, and the second array of microlenses are all included on a peripheral portion of the lens substrate;
and the lens holder member contains an opening corresponding to the central portion of the lens substrate for permitting light to impinge on the first array of microlenses.

9. The method of claim 8 wherein:
the lens substrate, the lens holder member, and the securing member are all generally planar members;
and the lens holder member is generally opaque, thereby preventing light from impinging on the second array of microlenses.

10. A method for making an optical device comprising the steps of:
forming on a planar lens substrate first and second arrays of microlenses, each protruding from a flat surface of the lens substrate, the first array of microlenses having a first configuration, and the second array of microlenses having a second configuration;
forming on a planar holder member an array of detents having said second configuration;
abutting said planar lens substrate against the planar holder member such that each lens of the second array of microlenses extends into one of the detents of the holder member, thereby to align the first array of microlenses with the holder member;
and bonding said planar lens substrate to said planar holder member.

11. The method of claim 10 wherein:
the first array of microlenses are all contained on a central portion of the planar lens substrate, and the second array of microlenses are all included on a peripheral portion of the planar lens substrate;
and the lens holder member contains an opening corresponding to the central portion of the lens substrate for permitting light to be transmitted to or from the first array of microlenses.

12. The method of claim 11 wherein:
the microlenses of the first array each have the same first diameter;
and the microlenses of the second array each have a second diameter somewhat larger than the first diameter.

13. The method of claim 10 wherein:
the microlens forming step comprises the step of forming first and second arrays of polymer elements on a generally flat surface, and heating the polymer elements sufficiently that they each soften to form a generally spherical meniscus, and then cooling the polymer elements to harden them.

14. The method of claim 13 wherein:
the holder member is made of monocrystalline material;
and the detents are made by photolithographic masking and etching.

15. The method of claim 10 wherein:
the first and second arrays of microlenses are made on a first flat surface of a first lens substrate; and further comprising the steps of:
forming on second lens substrate third and fourth arrays of microlenses, the third array having a configuration corresponding to the first configuration, the fourth array having a fourth configuration;
the holder member having on a first surface a first array of detents having said second configuration, and a second array of detents on a second surface opposite the first surface, said second array of detents having said fourth configuration;
and abutting said second substrate against the second surface of the holder member such that each microlens of the fourth array of microlenses extends into one of the detents of the second array of detents, thereby to align the third array of microlenses with the first array of microlenses.

16. The method of claim 15 wherein:
the lens holder member comprises a first flat holder member element having said first array of detents in said first surface and a second holder member element having said second array of detents on a second surface; and further comprising the steps of:
forming matching spacing detents on facing surfaces of the first and second holder member elements;
and inserting a sphere having a larger diameter than the maximum diameter in the spacing detents of the first and second holder member elements, thereby to space apart by a predetermined distance the holder member elements.

17. The method of claim 16 wherein:
the spacing detents are made by etching a first aperture extending from the first surface of the first holder member element entirely through the first holder member element and second aperture from the second surface of the second holder member element entirely through the second holder member element.

18. A method for aligning microlens arrays comprising the steps of:
forming on a first lens substrate first and second arrays of microlenses, each protruding from a flat surface of the lens substrate, the first array of microlenses having a first configuration, and the second array of microlenses having a second configuration;
forming on a second lens substrate third and fourth arrays of microlenses, each protruding from a flat surface of the second lens substrate, the third array of microlenses having said first configuration, and the fourth array of microlenses having said second configuration;
making in a first surface of a first planar holder element a first array of detents having said second configuration and an aperture extending through said first holder element;
making in a first surface of a second planar holder element a second array of detents having said second configuration and an aperture extending through the second holder element;
abutting the first lens substrate against the first surface of the first holder element such that each microlens of the second array of microlenses extends into one of the detents of the first holder member, thereby to align the first array of microlenses with the first holder member, abutting said second planar lens substrate against the first surface of the second holder element such that each lens of the fourth array of microlenses extends into one of the detents of the second holder element, thereby to align the third array of microlenses with the second holder member;

and aligning the first and second holder elements by abutting the apertures of the first and second holder elements against a spacer ball having a larger diameter than the diameter of either aperture.

19. The method of claim 18 wherein:

each of the holder elements contains a plurality of apertures, the apertures in the first holder element having locations corresponding to those of the second holder element, and a separate spacer ball is abutted against corresponding apertures of both of the holder elements.

20. The method of claim 19 further comprising the steps of:

bonding the first lens substrate to the first holder element;

bonding the second lens substrate to the second holder element;

and bonding the first holder element to the second holder element with said spacer balls being contained between said first and second holder elements.

21. A method for aligning microlens arrays comprising the steps of:

forming on a first lens substrate first and second arrays of microlenses, each protruding from a flat surface of the lens substrate, the first array of microlenses having a first configuration, and the second array of microlenses having a second configuration;

forming on a second lens substrate third and fourth arrays of microlenses, each protruding from a flat surface of the second lens substrate, the third array of microlenses having said first configuration, and the fourth array of microlenses having said second configuration;

abutting the lens substrates against a plurality of ball lens spacers such that each of the second and fourth arrays of microlenses abuts against the ball lens spacers;

and bonding the first and second lens substrates to the ball lens spacers.

22. The method of claim 21 wherein:

the second and fourth arrays of microlenses are arranged to form a plurality of tripods, each tripod bearing against one of the ball lens spacers.

* * * * *